3,346,661
START UP PROCEDURE FOR OLEFIN DISPROPORTIONATION REACTIONS
Reagan T. Wilson and Lewis G. Larson, Bartlesville, Okla., assignors to Phillips Petroleum Company, a corporation of Delaware
Filed June 4, 1964, Ser. No. 372,552
6 Claims. (Cl. 260—683)

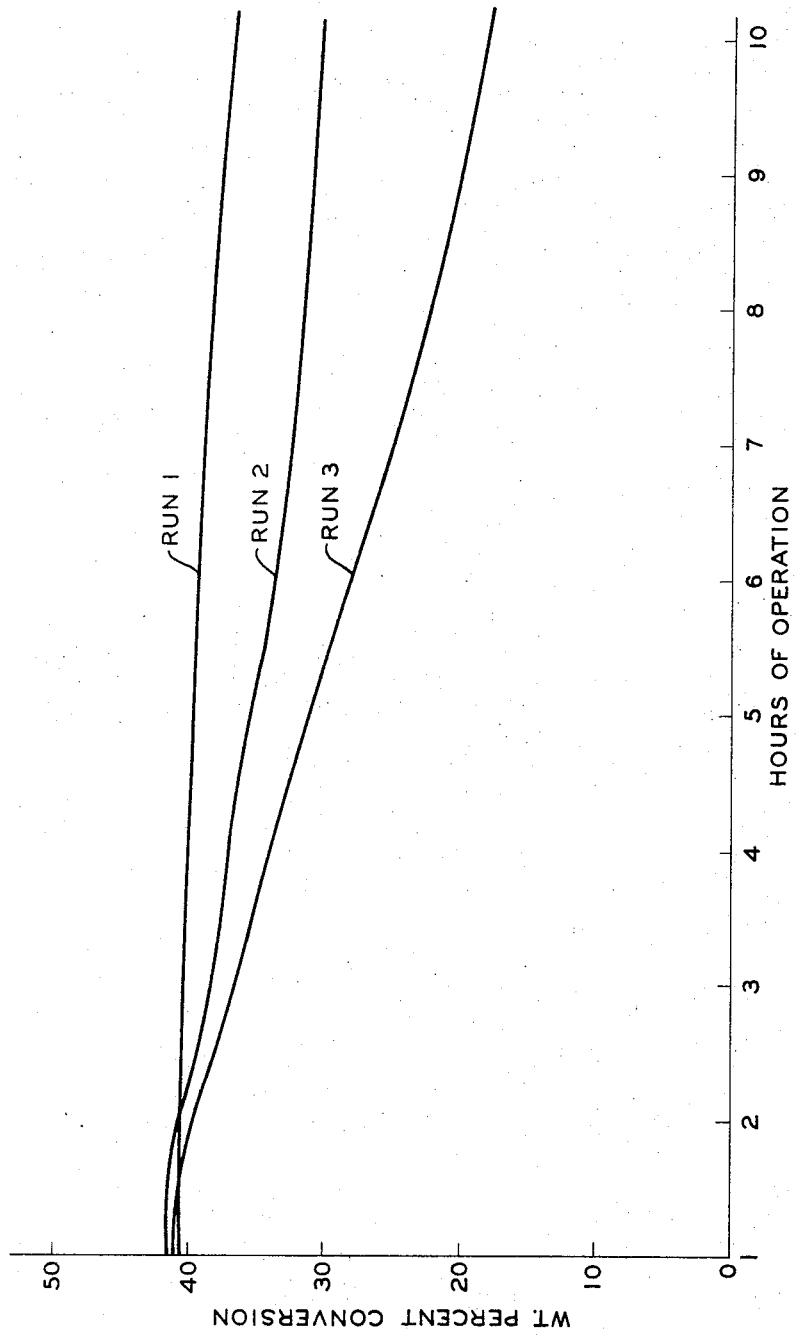

ABSTRACT OF THE DISCLOSURE

A start up procedure for catalytic olefin disproportionation reactions by lowering the temperature of the catalyst below reaction temperature a sufficient amount that the heat of adsorption of the reactants upon the surface of the catalyst will raise the temperature of the catalyst to the desired reaction temperature.

---

This invention relates to catalytic chemical reactions. In one aspect, the invention relates to an improved start-up procedure for a catalytic reaction. In another aspect, the invention relates to an improved start-up procedure for a catalytic olefin disproportionation process.

Many chemical reactions are carried on by contact of a fluid reactant stream with a highly adsorptive solid catalyst. Frequently, such catalysts must be heated to a temperature considerably above reaction temperature for activation and for regeneration. In the present application, the word "activation" is used generically to include both the initial activation, prior to first contact with the reactant stream, and a subsequent reactivation or regeneration following a period of use. Often it is desirable to cool the catalyst following activation to a temperature in the range of the desired operating conditions.

We have found that frequently the heat of adsorption of the reactant stream on the activated catalyst raises the temperature thereof an amount sufficient to be disadvantageous in the operation. This is particularly true with exothermic reactions since it sometimes is difficult to prevent a very large temperature increase and considerable time may be required to reduce the temperature to the desired value. The excess temperature tends to reduce the effectiveness of the catalyst and to make it necessary to regenerate at an earlier time. We have also found that, when the catalyst, following activation is cooled a sufficient amount below reaction temperature that the heat of adsorption of the reactants upon the surface of the catalyst will raise the temperature of the catalyst to the desired operating temperature, such disadvantage can be avoided.

An object of our invention is to improve the operation of a catalytic process.

Another object of our invention is to improve the temperature control at start-up of an exothermic catalytic chemical reaction.

Another object of our invention is to prevent damage to a catalyst by overheating during a reaction start-up.

Other aspects, objects, and the advantages of our invention are apparent in the written description and the claims.

According to our invention, in a catalytic process wherein a catalyst is activated by raising the temperature above reaction temperature and the temperature is lowered prior to initiating or reinitiating the reaction, an improvement is accomplished by lowering the temperature of the catalyst a sufficient amount below reaction temperature that the heat of adsorption of reactants on the surface of the catalyst will raise the temperature of the catalyst to the desired operating temperature. In many instances, the desired temperature to which the activated catalyst is cooled is between about 10 and 100° F. below the desired reaction operating temperature. It is important that the temperature after the initial temperature rise be above the threshold temperature for initiation of the desired reaction but below any temperature at which undesired reactions are promoted excessively, the catalyst is damaged, or a runaway condition is reached.

Our invention is applicable to the disproportionation of olefin hydrocarbons. Suitable catalysts and conditions for disproportionation are disclosed in U.S. patent application Ser. No. 94,996, Banks, filed Feb. 3, 1964; U.S. patent application Ser. No. 312,209, Banks, filed Sept. 27, 1963, now Patent No. 3,261,879; and U.S. patent application Ser. No. 307,371, Hecklesberg, filed Sept. 9, 1963, now abandoned. Examples of suitable catalysts include molybdenum oxide of alumina (including cobalt molybdate on alumina), tungsten oxide on silica, and tungsten or molybdenum hexacarbonyl on silica, silica-alumina or alumina. Our invention has particular applicability to an olefin disproportionation process utilizing a molybdenum oxide on alumina catalyst. A specific catalyst for the practice of our invention is one wherein the amount of molybdenum oxide is in the range of 0.5 to 30 percent by weight of the total catalyst composition, preferably 1 to 15 percent, and cobalt oxide is present in the range of 0 to 20 percent by weight of the total catalyst, preferably 1 to 5 percent. Excellent results with high conversion have been obtained with molybdenum oxide in the range of 4 to 13 percent by weight of the total catalyst. A commercially available catalyst which has been utilized in the practice of our invention comprises 11.0 weight percent molybdenum oxide, 3.4 weight percent cobalt oxide, and 85.6 weight percent aluminum oxide, and has a surface area of about 280 $M^2/g$. and a density of about 0.60 g./cc.

In a typical start-up procedure according to our invention, either for initial start-up or start-up after regeneration with the 11.0:3.4:85.6 $MoO_3$—$CoO$—$Al_2O_3$ catalyst according to our invention includes the following steps:

(1) Regenerate at temperatures below 1100° F.;
(2) Treat with dry air for 5 hours at 1100° F.;
(3) Cool reactor to 10–100° F. lower than operating temperature; and
(4) Begin feed of the olefin-containing reactant stream.

Our invention is applicable to many catalytic chemical reactions, among which can be named:

(1) Catalytic hydrodesulfurization;

(2) Benzene hydrogenation;
(3) Selective hydrogenation for butadiene;
(4) Acetylene removal from olefinic streams;
(5) Catalytic polymerization;
(6) Hydrocracking;
(7) Isomerization of n-butane to isobutane; and
(8) Pentane isomerization.

*Example*

In the following runs, the catalyst in all instances was an 11.0:3.4:85.6 $MoO_3$—CoO—$Al_2O_3$ catalyst having a surface area of 289 $M^2/g$. and a density of 0.60 g./cc. The feed was approximately 60 percent by weight propylene and 40 percent by weight propane. The temperatures and propylene conversions are given below in Table I and the results are plotted in the drawing.

TABLE I

|  | Run | | |
|---|---|---|---|
|  | 1 | 2 | 3 |
| Initial T., °F | 300 | 350 | 375 |
| 0-2 hrs. T., °F | 325 | 375 | 375 |
| 2-4 hrs. T., °F | 325 | 350 | 375 |
| 4-10 hrs. T., °F | 325 | 325 | 375 |
| SV, gm./hr./gm. | 7.3 | 6.8 | 8.6 |
| Propylene in Feed, Wt. percent | 59.56 | 59.32 | 57.92 |
| Propylene Conversion, Wt. percent: | | | |
| 1 hr | 40.8 | 41.9 | 41.9 |
| 1½ hrs | | 41.5 | 41.3 |
| 2 hrs | 40.5 | 40.7 | 40.2 |
| 2½ hrs | | 39.3 | 37.4 |
| 3 hrs | 40.2 | 37.5 | 36.7 |
| 3½ hrs | | 37.8 | 35.3 |
| 4 hrs | 40.1 | 37.8 | 33.4 |
| 4½ hrs | | 38.3 | 32.1 |
| 5 hrs | 40.0 | ¹41.3 | 31.1 |
| 5½ hrs | | 34.3 | 29.4 |
| 6 hrs | 39.6 | 33.3 | 28.4 |
| 6½ hrs | | 33.5 | 27.0 |
| 7 hrs | 39.5 | 32.8 | 25.1 |
| 7½ hrs | | 32.2 | 23.2 |
| 8 hrs | 38.8 | 32.5 | 21.8 |
| 8½ hrs | | 31.7 | 21.5 |
| 9 hrs | 38.4 | 31.7 | 20.4 |
| 9½ hrs | 38.0 | 31.2 | 19.2 |
| 10 hrs | 37.6 | 30.7 | 18.3 |
| Average | 39.5 | 36.5 | 29.7 |

¹ Low S.V.

In all of the above runs, the catalyst was contained within a fixed bed through which the reaction stream flowed. The reaction stream was dried prior to feeding through the bed and was analyzed by chromatograph and an analysis digital system.

In Run 1, with a relatively low temperature start-up, a 60° F. temperature rise quickly ran through the catalyst bed and was under control in less than 15 minutes. In Run 2, there was a 77° F. temperature rise and it took between ¾ and one hour to get the temperature under control at 375° F. Run 3 is included for comparison with Run 1 to show the effect of the higher temperature on the catalyst activity.

Reasonable variation and modification are possible within the scope of our invention which sets forth an improved method for initiating exothermic reactions.

We claim:

1. In a catalytic olefin disproportionation process wherein a solid olefin disproportionation catalyst is maintained in a fixed bed and contacted with an olefin for conversion thereof and wherein the catalyst is regenerated by raising the temperature above reaction temperature and lowering the temperature prior to reinitiating the reaction, the improvement which comprises lowering the temperature of the catalyst below reaction temperature a sufficient amount that the heat of adsorption of the reactant stream including said olefin upon the surface of the catalyst will raise the temperature of the catalyst to the desired disproportionating temperature.

2. The process of claim 1 wherein the temperature of said catalyst is lowered between 10 and 100° F. below reaction temperature.

3. In a catalytic olefin disproportionation process wherein an olefin disproportionation catalyst selected from the group consisting of molybdenum oxide on alumina, tungsten oxide on alumina, molybdenum oxide on silica, tungsten oxide on silica, molybdenum hexacarbonyl on silica-alumina, tungsten oxide on silica-alumina, tungsten hexacarbonyl on silica, molybdenum hexacarbonyl on silica, tungsten hexacarbonyl on alumina, molybdenum hexacarbonyl on alumina, tungsten hexacarbonyl on silica-alumina, and molybdenum hexacarbonyl on silica-alumina is maintained in a fixed bed and is contacted with an olefin for conversion thereof and wherein said catalyst is regenerated by raising the temperature above reaction temperature and lowering the temperature prior to reinitiating the disproportionation reaction, the improvement which comprises lowering the temperature of said catalyst below reaction temperature a sufficient amount that the heat of adsorption of the reactant stream, including the feed olefin, upon the surface of said catalyst will raise the temperature of the catalyst to a desired operating temperature.

4. The process of claim 3 wherein the temperature of said catalyst is lowered between 10 and 100° F. below reaction temperature.

5. In a catalytic olefin disproportionation process wherein a cobalt molybdate on alumina olefin disproportionation catalyst is maintained in a fixed bed and is contacted with an olefin for conversion thereof and wherein the catalyst is activated by heating to a temperature in the range of 700–1600° F., and the reaction temperature is in the range of 150–500° F., the improvement which comprises lowering the temperature of said catalyst a sufficient amount below reaction temperature that the heat of adsorption of the reactant stream, including the feed olefin, upon the surface of said catalyst will raise the temperature of the catalyst to a desired operating temperature.

6. The process of claim 5 wherein the temperature of said catalyst is lowered between 10 and 100° F. below reaction temperature.

References Cited

UNITED STATES PATENTS

| 2,428,914 | 10/1947 | Kassel | 260—683.15 |
| 2,595,254 | 5/1952 | Hemminger | 260—683 |
| 2,662,050 | 12/1953 | Moorman et al. | 208—160 |
| 2,897,143 | 7/1959 | Lester et al. | 208—216 |
| 2,935,374 | 5/1960 | Brooks | 208—159 |
| 3,261,879 | 7/1966 | Banks | 260—683 |

DELBERT E. GANTZ, *Primary Examiner.*

C. E. SPRESSER, *Assistant Examiner.*